United States Patent
Haddock et al.

Patent Number: 5,989,683
Date of Patent: Nov. 23, 1999

[54] WIRELESS POLYMERIC TWIST TIE

[75] Inventors: Thomas E. Haddock, Sioux Falls, S. Dak.; Michael P. Feltman, Worthington, Minn.

[73] Assignee: Bedford Industries, Inc., Worthington, Minn.

[21] Appl. No.: 08/933,772

[22] Filed: Sep. 19, 1997

[51] Int. Cl.⁶ .............................. B32B 3/28; B65D 77/10
[52] U.S. Cl. .................. 428/167; 24/30.5 P; 24/30.5 T; 264/177.1; 264/182
[58] Field of Search ..................... 428/156, 213, 428/480, 516, 167; 24/30.5 T, 30.5 P, 16 R; 264/146.1, 177.1, 173.13, 182; 156/244.11

[56] References Cited

U.S. PATENT DOCUMENTS

| | | | |
|---|---|---|---|
| 2,608,720 | 9/1952 | Meissner | 18/19 |
| 2,654,124 | 10/1953 | Layte | 18/5 |
| 2,685,707 | 8/1954 | Llewellyn et al. | 18/55 |
| 2,750,631 | 6/1956 | Johnson | 18/57 |
| 2,972,791 | 2/1961 | Kelem | 24/30.5 |
| 2,973,597 | 3/1961 | Powell | 40/21 |
| 3,068,135 | 12/1962 | Bower | 156/179 |
| 3,104,937 | 9/1963 | Wyckoff et al. | 18/48 |
| 3,138,904 | 6/1964 | Burford | 53/14 |
| 3,164,250 | 1/1965 | Paxton | 206/56 |
| 3,233,870 | 2/1966 | Gerhardt | 256/13.1 |
| 3,283,378 | 11/1966 | Cranton | 24/16 |
| 3,290,854 | 12/1966 | MacMurray | 53/14 |
| 3,311,288 | 3/1967 | Lemelson | 229/65 |
| 3,315,877 | 4/1967 | Grevich | 229/65 |
| 3,334,805 | 8/1967 | Halbach | 229/62 |
| 3,370,328 | 2/1968 | Hilton | 24/16 |
| 3,409,948 | 11/1968 | Goodwin | 24/16 |
| 3,426,393 | 2/1969 | Mead | 24/30.5 |
| 3,444,267 | 5/1969 | Beer | 260/876 |
| 3,444,269 | 5/1969 | Beer | 260/876 |
| 3,445,321 | 5/1969 | Groves | 428/167 |
| 3,470,685 | 10/1969 | Hall et al. | 57/140 |
| 3,494,522 | 2/1970 | Kim et al. | 225/97 |
| 3,520,963 | 7/1970 | Allseits et al. | 264/90 |
| 3,535,746 | 10/1970 | Thomas, Jr. | 24/30.5 |
| 3,540,184 | 11/1970 | Ashton | 53/14 |
| 3,565,738 | 2/1971 | Kirkpatrick | 161/38 |
| 3,604,066 | 9/1971 | Moon | 24/30.5 R |
| 3,633,247 | 1/1972 | Clayton | 24/30.5 PB |
| 3,662,434 | 5/1972 | Clayton | 24/30.5 P |
| 3,726,079 | 4/1973 | Feild et al. | 428/167 |
| 3,759,647 | 9/1973 | Schrenk et al. | 425/131 |
| 3,791,129 | 2/1974 | Shuford | 57/140 R |
| 3,857,139 | 12/1974 | Turner | 24/30.5 T |
| 3,882,573 | 5/1975 | Thomas, Jr. | 24/30.5 T |
| 3,884,606 | 5/1975 | Schrenk | 425/133.5 |
| 3,896,991 | 7/1975 | Kozlowski et al. | 229/55 |
| 3,962,524 | 6/1976 | Miyamoto et al. | 428/435 |
| 3,966,381 | 6/1976 | Suh | 425/376 |
| 3,983,202 | 9/1976 | Skoroszewski | 264/147 |
| 3,985,847 | 10/1976 | Hyun | 264/51 |
| 4,008,295 | 2/1977 | Koshida et al. | 260/876 R |
| 4,022,863 | 5/1977 | Karass et al. | 264/210 R |
| 4,034,013 | 7/1977 | Lane | 260/835 |
| 4,079,114 | 3/1978 | Bonner | 264/210 R |
| 4,079,484 | 3/1978 | Nakama | 24/16 PB |
| 4,083,914 | 4/1978 | Schippers et al. | 264/147 |
| 4,096,202 | 6/1978 | Farnham et al. | 260/873 |
| 4,194,772 | 3/1980 | Hurd et al. | 292/256.65 |
| 4,317,764 | 3/1982 | Sheer | 524/449 |
| 4,342,846 | 8/1982 | Silberberg | 525/64 |
| 4,358,466 | 11/1982 | Stevenson | 426/106 |
| 4,392,897 | 7/1983 | Herrington | 156/66 |
| 4,444,949 | 4/1984 | Liu | 525/67 |
| 4,451,422 | 5/1984 | Yui et al. | 264/178 |
| 4,457,517 | 7/1984 | Dunegan | 277/12 |
| 4,473,919 | 10/1984 | Fritz, Jr. | 15/250.4 |
| 4,510,287 | 4/1985 | Wu | 525/84 |

(List continued on next page.)

FOREIGN PATENT DOCUMENTS

| 2089879 | 6/1982 | United Kingdom | F16B 2/26 |
|---|---|---|---|

*Primary Examiner*—Donald Loney
*Attorney, Agent, or Firm*—Kinney & Lange, P.A.

[57] ABSTRACT

A wireless polymeric twist tie that includes a wing portion and at least one rib portion. The polymeric twist tie is formed from a non-metallic polymeric composition that includes an alloy of polycarbonate and acrylonitrile butadiene styrene or an alloy of polycarbonate and polybutylene terephthalate.

39 Claims, 1 Drawing Sheet

U.S. PATENT DOCUMENTS

| | | | |
|---|---|---|---|
| 4,587,300 | 5/1986 | Valentine | 525/95 |
| 4,797,313 | 1/1989 | Stolk et al. | 428/150 |
| 4,965,135 | 10/1990 | Im et al. | 428/412 |
| 5,128,409 | 7/1992 | Gagger | 525/67 |
| 5,154,964 | 10/1992 | Iwai et al. | 428/156 |
| 5,238,631 | 8/1993 | Stolk et al. | 264/147 |
| 5,324,307 | 6/1994 | Jarrett et al. | 606/219 |
| 5,342,687 | 8/1994 | Iwai et al. | 428/402 |
| 5,580,924 | 12/1996 | Wildi et al. | 525/65 |
| 5,602,201 | 2/1997 | Fujiuchi et al. | 525/67 |
| 5,605,948 | 2/1997 | Dumont et al. | 524/162 |
| 5,607,748 | 3/1997 | Feltman | 428/156 |
| 5,646,233 | 7/1997 | Sakashita et al. | 528/176 |

WIRELESS POLYMERIC TWIST TIE

BACKGROUND OF THE INVENTION

The present invention relates generally to a wireless polymeric twist tie. More particularly, the present invention relates to a wireless polymeric twist tie formed from a polycarbonate alloy.

Twist ties are used for various fastening and closing purposes. Typically, twist ties are used to seal a package having an open end, such as a bag. To seal the package, packaging material adjacent to the open end is gathered. The twist tie is extended around the gathered packaging material until end portions of the twist tie are adjacent to each other. The end portions are then twisted relative to the remainder of the twist tie to fasten the twist tie onto the package.

Twist ties typically include a wire that is enclosed in a paper or plastic wing. Twist ties that include the paper or plastic enclosed wire are subsequently referred to as wire twist ties. Wire twist ties have many advantageous properties that have led to widespread use of wire twist ties. For example, wire twist ties are readily applied using either manual or high speed mechanical operations. In addition, multiple fastening and unfastening cycles do not significantly affect the fastening capability of wire twist ties. Wire twist ties are also functional over a wide range of temperatures without a significant reduction in fastening capability.

There are many food packaging applications where wire twist ties play an important role because wire twist ties enable consumers to quickly access and reseal a product container numerous times. One disadvantage of existing wire twist ties is that consumers desire food to be packaged in a material that enables heating of the food in its original packaging. One type of heating where it is particularly desirable to heat food in its original packaging is in a microwave oven. Existing wire twist ties, however, are not suitable for use in microwave ovens because wire twist ties generally cause undesirable arcing when the twist tie is subjected to microwave radiation at an intensity conventionally found in microwave ovens.

Another disadvantage of existing wire twist ties concerns conventional food distribution. When food is commercially packaged for distribution to the public, it is desirable to insure that the food is free from contamination by foreign objects. Therefore, commercially packaged food is typically inspected after the food is package. A common method of inspecting food products involves the use of metal detectors. One drawback of using wire twist ties is that wire twist ties preclude the use of metal detectors.

To overcome these difficulties, a variety of non-metallic closures, such as polymeric closures have been developed. Polymeric twist ties are an example of the polymeric closures. There have been numerous attempts to develop a polymeric twist tie that exhibits desirable toughness and flexibility characteristics while also being easily fastenable and unfastenable over numerous cycles.

For example, Feltman, U.S. Pat. No. 5,607,748, which is assigned to the assignee of the present application, describes forming wireless polymeric twist ties that exhibit a tensile strength and a yield strength of greater than 9,000 psi Stolk et al., U.S. Pat. No. 4,797,313, discloses using polymeric materials that provide a yield stress of less than 9,000 psi and preferably between 2,000 and 4,000 psi. Stolk et al. indicates that a yield stress of less than 9,000 psi is necessary so that the polymeric materials exhibit a desired glass/rubber transition behavior.

There have been numerous other attempts to provide an entirely polymeric closure. For example, Thomas, U.S. Pat. No. 3,535,746; Moon, U.S. Pat. No. 3,604,066; and Hoard, U.S. Pat. No. 3,945,086, disclose polymeric closure devices. However, none of these polymeric closure devices are believed to be suitable for substitution in place of wire twist ties in machinery that presently handles high speed mechanical packaging with wire twist ties.

SUMMARY OF THE INVENTION

The present invention is a wireless polymeric twist tie that includes a wing portion and at least one rib portion. The polymeric twist tie is formed from a non-metallic polymeric composition that comprises an alloy of polycarbonate and acrylonitrile butadiene styrene and an alloy of polycarbonate and polybutylene terephthalate.

DETAILED DESCRIPTION OF THE PREFERRED EMBODIMENTS

Figure 1:
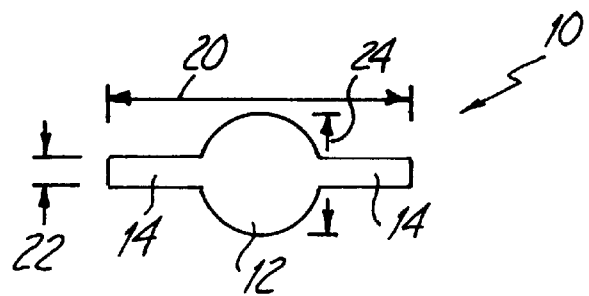
FIG. 1 is a sectional view of a wireless polymeric twist tie of the present invention.

A wireless polymeric twist tie of the present invention is generally illustrated at 10 in FIG. 1. The polymeric twist tie 10 includes a rib portion 12 and a wing portion 14. The rib portion 12 and the wing portion 14 are preferably constructed from the same material. However, a person of ordinary skill in the art will appreciate that the concepts of the present invention to form a polymeric twist tie where the rib portion 12 is a different material than the wing portion 14.

In one preferred embodiment, the rib portion 12 is centrally located in the polymeric twist tie 10. The polymeric twist tie 10 preferably has a width 20 of between about 0.125 inches and 0.250 inches. The wing portion 14 preferably has a thickness 22 of between about 0.004 inches and 0.012 inches. The rib portion 12 has a thickness 24 of between about 0.030 inches and 0.125 inches.

While the polymeric twist ties 10 is depicted as having a rib portion 12 with a substantially circular profile, other profiles may be used depending on the desired shape of the polymeric twist tie. For example, the rib portion 12 may have a substantially square profile and the wing portion 14 may have a taper profile where the wing portion 14 is wider where the wing portion 14 intersects the rib portion 12.

Figure 2:
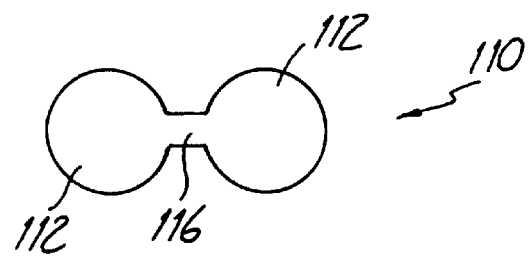
FIG. 2 is a sectional view of a first alternative embodiment of the wireless polymeric twist tie.

In a first alternative configuration, the polymeric twist tie 110 includes a pair of rib portions 112 with a web portion 116 extending therebetween, as is most clearly illustrated in FIG. 2. In a second alternative configuration, the polymeric twist tie 210 includes a pair of rib portions 212, a web portion 216 extending therebetween, and a pair of wing portions 214 that each extend from the rib portions 212 opposite the web portion 216, as most clearly illustrated in FIG. 3.

Figure 4:
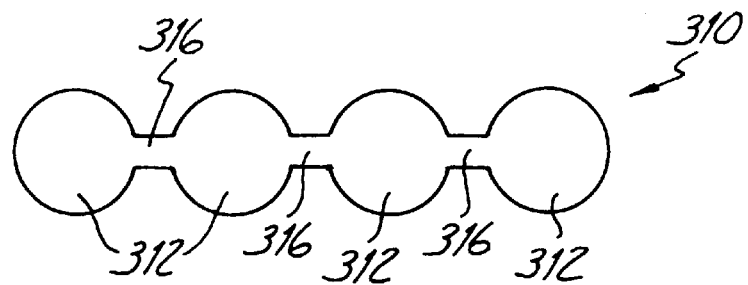
FIG. 4 is a sectional view of a third alternative embodiment of the wireless polymeric twist tie.

In a third alternative configuration, the polymeric twist tie 310 includes four rib portions 312 and three web portions 316, as most clearly illustrated in FIG. 4. The web portions 316 interconnect adjacent rib portions 312.

The polymeric twist tie is preferably used to seal a package having an opening at an end. To seal the package, package material adjacent to the opening is gather. The polymeric twist tie is wrapped around the gathered package material until end portions of the polymeric twist tie are adjacent to each other. The end portions are then twisted with relative to the remainder of the polymeric twist to fasten the twist tie onto the package.

To accomplish the sealing of the package, the polymeric twist tie must exhibit several physical characteristics. In particular, the polymeric twist tie must replicate many of the desirable traits exhibited by wire twist ties, such as retaining a selected position when fastened and being capable of repeated cycles of fastening and unfastening. In addition, the polymeric twist tie of the present invention is suitable for use with high speed mechanical packaging machines. However, unlike existing wire twist ties, the polymeric twist tie of the present invention does not pose an arcing hazard when exposed to microwave radiation in a microwave oven.

Another advantage of the polymeric twist tie of the present invention is that the polymeric twist tie is readily recyclable the polymeric twist tie is entirely fabricated from polymeric materials. Wire twist ties, on the other hand, have metallic and paper or plastic components that must be separated prior to recycling.

In a first preferred embodiment, the polymeric twist tie is formed from an alloy of polycarbonate and acrylonitrile butadiene styrene. One preferred alloy of polycarbonate and acrylonitrile butadiene styrene is sold under the designation CYCOLOY by GE Plastics. A preferred formulation of the polycarbonate and acrylonitrile butadiene styrene alloy is marketed under the designation CYCOLOYC1110. Physical properties of CYCOLOYC1110 resin are set forth in Table 1.

TABLE 1

| Density | 71.2 lb/ft$^3$ |
|---|---|
| Tensile strength at yield | 8.00 × 10$^3$ psi |
| Elongation at break | 150 percent |
| Elongation at yield | 5 percent |
| Tensile modulus | 3.20 × 10$^5$ psi |
| Flexural strength at yield | 1.20 × 10$^4$ psi |
| Flexural modulus | 3.40 × 10$^5$ psi |
| Hardness (Rockwell) | 115 R |
| Linear thermal expansion | 4.10 × 10$^{-5}$ in/in/° F. |

Another alloy of polycarbonate and acrylonitrile butadiene styrene that is particularly suited for use with the present invention is marketed under the name PULSE by Dow Chemical Co. A preferred formulation of the PULSE polycarbonate and acrylonitrile butadiene styrene alloy is marketed under the designation PULSE 1370 by Dow Chemical Co. Physical properties of PULSE 1370 resin are set forth in Table 2.

TABLE 2

| Tensile strength at yield | 7.50 × 10$^3$ psi |
|---|---|
| Elongation at break | 125 percent |
| Tensile modulus | 4.24 × 10$^5$ psi |
| Flexural strength at yield | 1.20 × 10$^4$ psi |
| Flexural modulus | 3.35 × 10$^5$ psi |
| Hardness (Rockwell) | 115 R |
| Linear thermal expansion | 4.10 × 10$^{-5}$ in/in/° F. |

Yet another polymeric material that is suited for use with the present invention is an alloy of polycarbonate and polybutylene terephthalate, which is marketed by GE Plastics under the designation XENOY. A preferred formulation of the XENOY polycarbonate and polybutylene terephthalate alloy is marketed under the designation XENOY 5220 by GE Plastics. Physical properties of XENOY 5220 resin are set forth in Table 3.

TABLE 3

| Density | 4.4 × 10$^{-2}$ lb/in$^3$ |
|---|---|
| Tensile strength at yield | 7.70 × 10$^3$ psi |
| Elongation at break | 120 percent |
| Elongation at yield | 6.43 percent |
| Tensile modulus | 4.88 × 10$^5$ psi |
| Flexural strength at yield | 1.23 × 10$^4$ psi |
| Flexural modulus | 2.96 × 10$^5$ psi |
| Hardness (Rockwell) | 112 R |
| Linear thermal expansion | 4.3 × 10$^{-5}$ in/in/° F. |

A preferred mixture of polymeric components used for fabricating the polymeric twist tie includes polycarbonate and acrylonitrile butadiene styrene alloy, styrene butadiene multiblock polymer, and styrene acrylonitrile. In this embodiment, the polycarbonate and acrylonitrile butadiene styrene alloy has a concentration of greater than 60 percent by weight and preferably greater than 70 percent by weight. The styrene butadiene multiblock polymer has a concentration of up to 30 percent by weight and preferably between about 15 and 25 percent by weight. The styrene acrylonitrile has a concentration of up to 10 percent by weight and preferably about 5 percent by weight.

The polycarbonate and acrylonitrile butadiene styrene alloy is preferably CYCOLOY C1110, which can be obtained from GE Plastics. The styrene butadiene multiblock polymer is preferably STEREON 840A, which can be obtained from Firestone. The styrene acrylonitrile is preferably TYRIL 880B, which can be obtained from Dow Chemical Co.

This preferred embodiment may also contain polyethylene at a concentration of up to about 6 percent by weight and preferably about 4 percent by weight. The polyethylene is preferably PETROTHENE LM 6005-00, which can be obtained from Quantum Chemical Co.

In another preferred embodiment, the polymeric twist tie is formed from polycarbonate and acrylonitrile butadiene styrene alloy, styrene butadiene multiblock polymer, and polybutylene terephthalate. In this embodiment, the polycarbonate and acrylonitrile butadiene styrene alloy has a concentration of greater than 80 percent by weight and preferably greater than 85 percent by weight. The styrene butadiene multiblock polymer has a concentration of up to 10 percent by weight and preferably between about 4 and 5 percent by weight. The polybutylene terephthalate has a concentration of up to 10 percent by weight and preferably between about 4 and 10 percent by weight.

The polycarbonate and acrylonitrile butadiene styrene alloy used in this embodiment is preferably CYCOLOY C1110, which can be obtained from GE Plastics. The styrene butadiene multiblock polymer is preferably STEREON 840A, which can be obtained from Firestone. The polybutylene terephthalate is preferably CELANEX 1602Z, which can be obtained from Hoechst Celanese.

A person of ordinary skill in the art will appreciate that color concentrates may also be used when preparing the polymeric twist tie. For most applications, the level of color concentrate is typically less than 4 percent by weight. The carrier used for delivering the color concentrate is selected to be compatible with the other components used in fabricating the polymeric twist tie. Two particularly useful carrier resins for use with the present invention include acrylonitrile butadiene styrene and polyethylene.

The first step in manufacturing the polymeric twist tie is blending the polymeric components used to fabricate the polymeric twist tie. The components are preferably dry-blended to obtain a substantially homogeneous mixture. The dry-blended mixture is preferably dried using a desiccant bed-type system. The mixture is preferably dried to a moisture content of less than 0.02 percent.

After the desiccant drying is completed, nitrogen is purged through the dry-blended mixture to further dry the mixture. A nitrogen blanket is also used to maintain the dry-blended mixture in a dried state prior to extrusion of the dry-blended mixture.

The dry-blended mixture is then fed into an extruder. Selection of an appropriate extruder for extruding polycarbonate and acrylonitrile butadiene styrene-based polymers is known in the art. The extruder preferably has a diameter of about 1.5 inches and length-to-diameter ratio of about 24:1. When extruding polymeric materials there are several interrelated variables: viscosity of the polymeric material, temperature of the extruder heat zones, die size and geometry, and screw rotation speed. However, the most common manner of characterizing extrusion characteristics is melt flow temperature. The term "melt flow temperature" means the approximate temperature of the material being extruded.

The extruder preferably has three barrel heat zones: a flange heat zone, a mixing section heat zone, and a die heat zone. The temperatures in these heat zones are set so that the melt flow temperature is between 450° F. and 550° F. and preferably between approximately 490° F. and 520° F. It has been found that maintaining the melt flow temperature between 450° F. and 550° F. produces a desired system pressure of between about 2,000 psi and 5,000 psi. Selection of the appropriate flange heat zone, mixture section heat zone, and die heat zone temperatures to obtain a melt flow temperatures between 450° F. and 550° F. is known in the art.

To ensure that the components are homogeneously mixed, a motionless mixture, which is also known as a static mixer, may be attached to the outlet end of the extruder. One preferable motionless mixer is available from Ross Engineering of Hauppauge, N.Y. under the designation ISG Motionless Mixer.

The mixture is then extruded through a die. The selection of the size and shape of the die is known in the art and is based on the desired dimensions of the polymeric twist tie. Preferably, the die extrudes the mixture at a 90 degree angle with respect to the extruder to facilitate feeding of the polymeric twist tie into a water bath.

The size of the water bath is selected based upon the rate at which the mixture is extruded so that the extruded mixture is sufficiently cooled prior to exiting the water bath. The water bath preferably has a length of about 8 feet and is maintained at a temperature of between about 10° C. and 27° C.

If the polymeric twist tie is not sufficiently cooled, the polymeric twist tie will exhibit a memory when the polymeric twist tie is wound around a spool. The term "memory" means that the polymeric twist tie will retain a shape. In the case of the spool, the polymeric twist tie will retain a curved shape even after the polymeric twist tie is removed from the spool. However, when the polymeric twist tie is sufficiently cooled prior to winding on the spool, the polymeric twist tie returns to a substantially linear shape after unwinding from the spool.

An important aspect of the present invention is the draw down of the extruded twist tie between the die and the water bath. The term "draw down" means a ratio of the profile area of the polymeric twist tie as the polymeric twist tie exits the extruder to a profile area of the polymeric twist tie after the polymeric twist solidifies. Draw down causes the polymers in the twist tie to become axially oriented, which results in the polymeric twist tie exhibiting greater tensile strength and yield strength values. The amount of draw down is determined by the rate at which material is extruded, the viscosity of the extruded material and the speed at which the pull down rollers are moving. The draw down ratio used in conjunction with the present invention is preferably between 3:1 and 10:1. Even more preferably, the draw down ratio is between 5:1 and 6:1.

It is also possible to further enhance the degree to which the polymers are axially oriented in the polymeric twist tie by further drawing down the polymeric twist tie are the cooled polymeric twist tie exits from the water bath. When post-cooling draw down is performed, the draw down is preferably about 100 percent.

There are several tests used to characterize the performance of the polymeric twist tie. These tests include tensile strength and percent elongation. The tensile strength and yield strength of the polymeric twist tie are measured using a tensile strength test performed according to the ASTM D-638 standard.

The polymeric twist tie of the present invention exhibits a tensile strength of greater than 5,000 psi. Preferably, the tensile strength of the polymeric twist is greater than 7,000 psi. The elongation of the polymeric twist tie of the present invention is greater than 100 percent. Preferably, the elongation of the polymeric twist tie is greater than 400 percent.

The polymeric twist tie of the present invention is described with reference to the following examples. These examples are provided as an illustration of the invention and are not intended to limit the scope of the invention.

EXAMPLE 1

The only material used to formulate the polymeric twist in this Example was an alloy of polycarbonate and acrylonitrile butadiene styrene (CYCOLOY C1110). The material was dried to a moisture content of less than 0.02 percent using a conventional desiccant bed-type system. The material was then fed into an extruder having a diameter of about 1.5 inches and a length to diameter ratio of about 24:1. The extruded form of the polymeric twist tie was substantially the same as the polymeric twist tie illustrated in FIG. 1.

The temperatures in the extruder were maintained so that the melt flow temperature of the material was approximately 520° F. Upon exiting the extruder, the material passed through a motionless mixer and then through a die. The mixture was then drawn down before being cooled in a water bath. The draw down ratio was approximately 5.9:1.

The tensile strength was approximately 9,562 psi. The elongation of the polymeric twist tie was approximately 476 percent.

EXAMPLE 2

The process of Example 1 except that the polymeric twist was subjected to an additional draw down after the polymeric twist tie was cooled using the water bath.

The temperatures in the extruder were maintained so that the melt flow temperature of the material was approximately 500° F. Upon exiting the extruder, the material passed through a motionless mixer and then through a die. The mixture was then subjected to an initial draw down before being cooled in a water bath. The initial draw down ratio was approximately 6:1. The additional draw down was conducted at room temperature and lengthened the polymeric twist tie 100 percent.

The physical properties of the polymeric twist tie were then evaluated. The tensile strength of the polymeric twist tie was 16,823 psi and the elongation was 134 percent.

EXAMPLE 3

The process of Example 1 was repeated except that a color concentrate was mixed with the polycarbonate and acrylonitrile butadiene styrene alloy prior to forming the polymeric twist tie. A first mixture contained a red color concentrate that was added to the mixture at a concentration of approximately 4 percent by weight. The color concentrate used in first mixture used acrylonitrile butadiene styrene and the carrier resin. A second mixture contained a green color concentrate that was added to the mixture at a concentration of approximately 2 percent by weight.

The temperatures in the extruder were maintained so that the melt flow temperature of the material was approximately 520° F. Upon exiting the extruder, the material passed through a motionless mixer and then through a die. The mixture was then subjected to an initial draw down before being cooled in a water bath. The initial draw down ratio was approximately 5.4:1.

The physical properties of the polymeric twist ties were then evaluated. The polymeric twist tie formed from the first mixture exhibited a tensile strength of approximately 7,302 and an elongation of about 261 percent. The polymeric twist tie formed from the second mixture exhibited a tensile strength of approximately 7,686 and an elongation of about 398 percent

EXAMPLE 4

The process of Example 1 was repeated except that the polycarbonate and acrylonitrile butadiene styrene alloy was blended with additional ingredients prior to extruding the polymeric twist tie. The additional ingredients used along with the polycarbonate and acrylonitrile butadiene styrene alloy are styrene butadiene multiblock polymer (STEREON 840A), styrene acrylonitrile (TYRIL 880B), polyethylene (PETROTHENE LM 6005-00), and polybutylene terephthalate (CELANEX 6102Z). The components and concentrations are set forth in Table 4.

The temperatures in the extruder were maintained so that the melt flow temperature of the material was approximately 500° F. Upon exiting the extruder, the material passed through a motionless mixer and then through a die. The mixture was then subjected to an initial draw down before being cooled in a water bath. The initial draw down ratio was approximately 6:1.

The physical properties of the polymeric twist tie were then evaluated. The results of the physical property analyses are set forth in Table 4.

EXAMPLE 5

Figure 3:
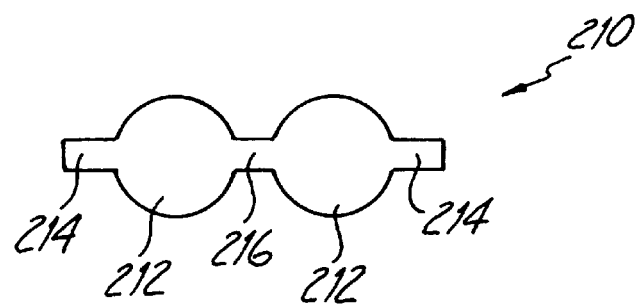
FIG. 3 is a sectional view of a second alternative embodiment of the wireless polymeric twist tie.

The process of Example 1 was repeated except that the shape of the polymeric twist tie was varied. A first variation of the polymeric twist tie included two rib portions and no wing portions and had a shape that is substantially as illustrated in FIG. 2. A second variation of the polymeric twist tie included two rib portions and wing portions extending outwardly rib portion that is substantially as illustrated in FIG. 3. A third variation of the polymeric twist tie includes four interconnected rib portions and had a shape that is substantially as illustrated in FIG. 4.

The temperatures in the extruder were maintained so that the melt flow temperature of the material was approximately 500° F. Upon exiting the extruder, the material passed through a motionless mixer and then through a die. The mixture was then drawn down before being cooled in a water bath. The draw down ratio was approximately 6:1.

The first variation exhibited a tensile strength of about 9,587 psi and an elongation of about 591 percent. The second variation exhibited a tensile strength of about 9,062 psi and an elongation of about 484 percent. The third variation exhibited a tensile strength of about 11,759 psi and an elongation of about 501 percent.

Although the present invention has been described with reference to preferred embodiments, workers skilled in the art will recognize that changes may be made in form and detail without departing from the spirit and scope of the invention.

We claim:

1. A wireless polymeric twist tie comprising a rib portion and at least one wing portion, wherein the polymeric twist tie is formed from a non-metallic polymeric composition that comprises an alloy of polycarbonate and acrylonitrile butadiene styrene or an alloy of polycarbonate and polybutylene terephthalate.

2. The wireless polymeric twist tie of claim 1, wherein the non-metallic polymeric composition further comprises polyethylene, polybutylene terephthalate, styrene acrylonitrile, styrene butadiene multiblock polymer, and mixtures thereof.

3. The wireless polymeric twist tie of claim 2, wherein the non-metallic polymeric composition comprises a mixture of

TABLE 4

| Blend Number | Polycarbonate/ acrylonitrile butadiene styrene | Styrene butadiene multiblock polymer | Styrene acrylonitrile | Poly- propylene | Poly- butylene terephthalate | Tensile Strength (psi) | Elongation (percent) |
| --- | --- | --- | --- | --- | --- | --- | --- |
| 1 | 75.0 | 20.0 | 5.0 | 0 | 0 | 5,378 | 310 |
| 2 | 72.1 | 19.2 | 4.8 | 0 | 4.0 | 5,265 | 352 |
| 3 | 91.0 | 4.5 | 0 | 4.5 | 0 | 8,007 | 518 |
| 4 | 86.5 | 4.2 | 0 | 9.3 | 0 | 7,778 | 682 | polycarbonate and acrylonitrile butadiene styrene alloy, styrene butadiene multiblock polymer, and styrene acrylonitrile.

4. The wireless polymeric twist tie of claim 3, wherein the polycarbonate and acrylonitrile butadiene styrene alloy has a concentration of greater than about 70 percent by weight, the styrene butadiene multiblock polymer has a concentration of between about 15 and 25 percent by weight, the styrene acrylonitrile has a concentration of about 5 percent by weight.

5. The wireless polymeric twist tie of claim 4, wherein the mixture further polyethylene at a concentration of about 4 percent by weight.

6. The wireless polymeric twist tie of claim 2, wherein the non-metallic polymeric composition comprises a mixture of polycarbonate and acrylonitrile butadiene styrene alloy, styrene butadiene multiblock polymer, and polybutylene terephthalate.

7. The wireless polymeric twist tie of claim 6, wherein the polycarbonate and acrylonitrile butadiene styrene alloy has a concentration of greater than about 85 percent by weight, the styrene butadiene multiblock polymer has a concentration of between about 4 and 5 percent by weight, the polybutylene terephthalate has a concentration of between about 4 and 10 percent by weight.

8. The wireless polymeric twist tie of claim 2, wherein the non-metallic polymeric composition further comprises a color concentrate.

9. The wireless polymeric twist tie of claim 2, wherein the wireless polymeric twist tie exhibits an elongation of greater than about 100 percent and a tensile strength of greater than about 5,000 psi when analyzed according to the ASTM D-638 standard.

10. A wireless polymeric twist tie comprising four rib portions and three web portions, wherein the web portions each interconnect adjacent rib portions, and wherein the polymeric twist tie is formed from a non-metallic polymeric composition, the non-metallic polymeric composition comprising polycarbonate and polybutylene terephthalate.

11. The wireless polymeric twist tie of claim 10, wherein the polymeric twist tie exhibits an elongation of greater than 100 percent and a tensile strength of greater than 5,000 psi.

12. The wireless polymeric twist tie of claim 10 wherein:
each web portion is substantially continuous between each adjacent pair of rib portions; and
the composition of each web portion is substantially the same as the composition of each rib portion.

13. The wireless polymeric twist tie of claim 10 wherein:
adjacent pairs of rib portions are separated from each other by a space, each web portion substantially filling the space between one of the adjacent pairs of web portions; and
the composition of each web portion is substantially the same as the composition of each rib portion.

14. A method of making a wireless polymeric twist tie, the method comprising:
creating a non-metallic polymeric composition, the non-metallic polymeric composition comprising an alloy of polycarbonate and acrylonitrile butadiene styrene or an alloy of polycarbonate and polybutylene terephthalate; and
forming the non-metallic composition into the wireless polymeric twist tie.

15. The method of claim 14 wherein forming the non-metallic composition into the wireless polymeric twist tie comprises:
extruding the non-metallic composition to form a ribbon.

16. The method of claim 15, the method further comprising:
cooling the ribbon in a fluid medium to solidify the ribbon.

17. The method of claim 16 wherein the fluid medium is water that is held at a temperature of between about 10° C. and about 27° C.

18. The method of claim 16, the method further comprising drawing down the ribbon in the ratio of 3:1 to 10:1 prior to solidification of the ribbon.

19. The method of claim 16, the method further comprising drawing down the ribbon after solidification of the ribbon.

20. The method of claim 14 wherein the non-metallic polymeric composition further comprises polyethylene, polybutylene terephthalate, styrene acrylonitrile, styrene butadiene multiblock polymer, or mixtures thereof.

21. The method of claim 20 wherein the non-metallic polymeric composition comprises a mixture of polycarbonate and acrylonitrile butadiene styrene alloy, styrene butadiene multiblock polymer, and styrene acrylonitrile.

22. The method of claim 21 wherein the polycarbonate and acrylonitrile butadiene styrene alloy has a concentration of greater than about 70 percent by weight, the styrene butadiene multiblock polymer has a concentration of between about 15 and about 25 percent by weight, the styrene acrylonitrile has a concentration of about 5 percent by weight.

23. The method of claim 20 wherein the non-metallic polymeric composition comprises a mixture of polycarbonate and acrylonitrile butadiene styrene alloy, styrene butadiene multiblock polymer, and polybutylene terephthalate.

24. The method of claim 23 wherein the polycarbonate and acrylonitrile butadiene styrene alloy has a concentration of greater than about 85 percent by weight, the styrene butadiene multiblock polymer has a concentration of between about 4 and about 5 percent by weight, the polybutylene terephthalate has a concentration of between about 4 and about 10 percent by weight.

25. The method of claim 15 wherein the wireless polymeric twist tie exhibits an elongation of greater than about 100 percent and a tensile strength of greater than about 5,000 psi when analyzed according to the ASTM D-638 standard.

26. A method of making a wireless polymeric twist tie, the method comprising:
creating a non-metallic polymeric composition, the non-metallic polymeric composition comprising polycarbonate and acrylonitrile butadiene styrene; and
forming the non-metallic composition into the wireless polymeric twist tie, the wireless polymeric twist tie comprising four rib portions and three web portions, wherein the web portions each interconnect adjacent rib portions.

27. The method of claim 26 wherein forming the non-metallic composition into the wireless polymeric twist tie comprises:
extruding the non-metallic composition to form a ribbon.

28. The method of claim 26 wherein the polymeric twist tie exhibits an elongation of greater than 100 percent and a tensile strength of greater than 5,000 psi.

29. The method of claim 26 wherein:
each web portion is substantially continuous between each adjacent pair of rib portions; and
the composition of each web portion is substantially the same as the composition of each rib portion.

30. The method of claim 26 wherein:
adjacent pairs of rib portions are separated from each other by a space, each web portion substantially filling the space between one of the adjacent pairs of web portions; and
the composition of each web portion is substantially the same as the composition of each rib portion.

31. A wireless polymeric twist tie comprising four rib portions and three web portions, wherein the web portions each interconnect adjacent rib portions, and wherein the polymeric twist tie is formed from a non-metallic polymeric composition, the non-metallic polymeric composition comprising polycarbonate and acrylonitrile butadiene styrene.

32. The wireless polymeric twist tie of claim 31, wherein the polymeric twist tie exhibits an elongation of greater than 100 percent and a tensile strength of greater than 5,000 psi.

33. The wireless polymeric twist tie of claim 31 wherein:
   each web portion is substantially continuous between each adjacent pair of rib portions; and
   the composition of each web portion is substantially the same as the composition of each rib portion.

34. The wireless polymeric twist tie of claim 31 wherein:
   adjacent pairs of rib portions are separated from each other by a space, each web portion substantially filling the space between one of the adjacent pairs of web portions; and
   the composition of each web portion is substantially the same as the composition of each rib portion.

35. A method of making a wireless polymeric twist tie, the method comprising:
   creating a non-metallic polymeric composition, the non-metallic polymeric composition comprising polycarbonate and polybutylene terephthalate; and
   forming the non-metallic composition into the wireless polymeric twist tie, the wireless polymeric twist tie comprising four rib portions and three web portions, wherein the web portions each interconnect adjacent rib portions.

36. The method of claim 35 wherein the polymeric twist tie exhibits an elongation of greater than 100 percent and a tensile strength of greater than 5,000 psi.

37. The method of claim 35 wherein:
   each web portion is substantially continuous between each adjacent pair of rib portions; and
   the composition of each web portion is substantially the same as the composition of each rib portion.

38. The method of claim 35 wherein:
   adjacent pairs of rib portions are separated from each other by a space, each web portion substantially filling the space between one of the adjacent pairs of web portions; and
   the composition of each web portion is substantially the same as the composition of each rib portion.

39. The method of claim 35 wherein forming the non-metallic composition into the wireless polymeric twist tie comprises:
   extruding the non-metallic composition to form a ribbon.

* * * * *

UNITED STATES PATENT AND TRADEMARK OFFICE
CERTIFICATE OF CORRECTION

PATENT NO. : 5,989,683
DATED : NOVEMBER 23, 1999
INVENTOR(S) : THOMAS E. HADDOCK ET AL.

It is certified that error appears in the above-identified patent and that said Letters Patent is hereby corrected as shown below:

Col. 11, line 27, delete "tic", insert -- tie --

Signed and Sealed this

Second Day of January, 2001

Attest:

Attesting Officer

Q. TODD DICKINSON

Commissioner of Patents and Trademarks